May 5, 1953 G. H. DAVIS 2,637,182
DOUBLE-WALLED TUMBLER
Filed Jan. 27, 1950 2 SHEETS—SHEET 1
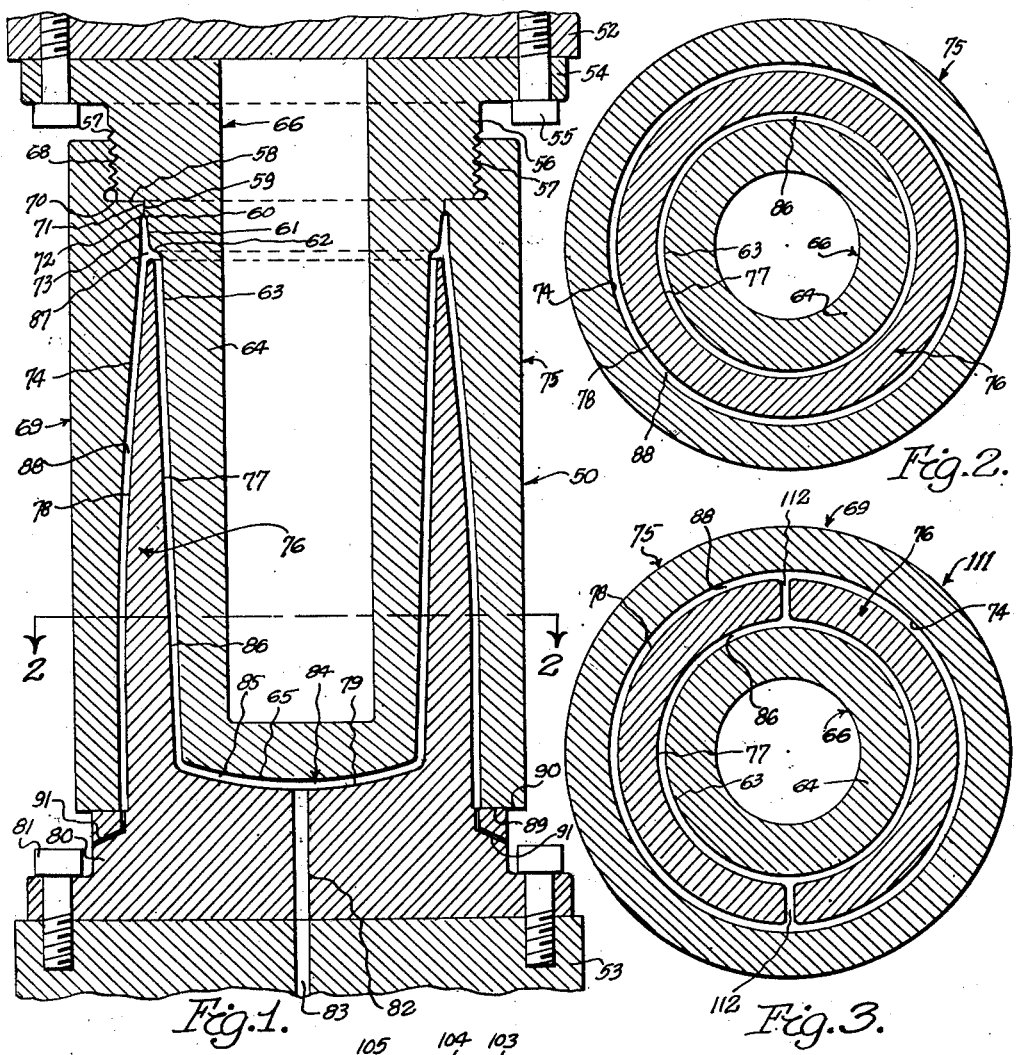
Inventor
George Howlett Davis
Barthel + Bugbee
Attorneys May 5, 1953 G. H. DAVIS 2,637,182
DOUBLE-WALLED TUMBLER
Filed Jan. 27, 1950 2 SHEETS—SHEET 2
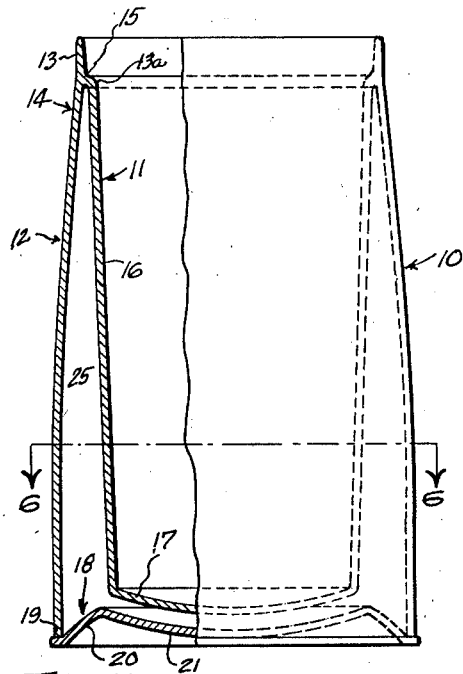
Fig. 5.
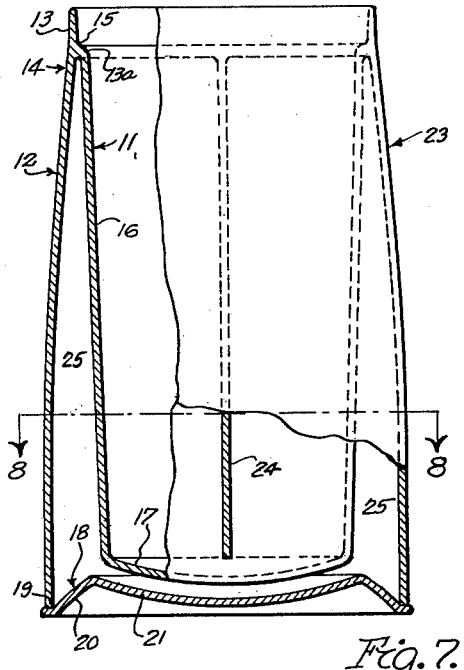
Fig. 7.
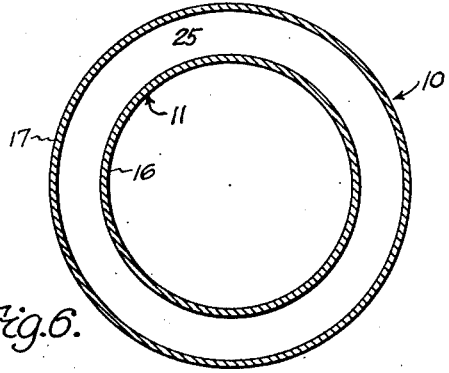
Fig. 6.
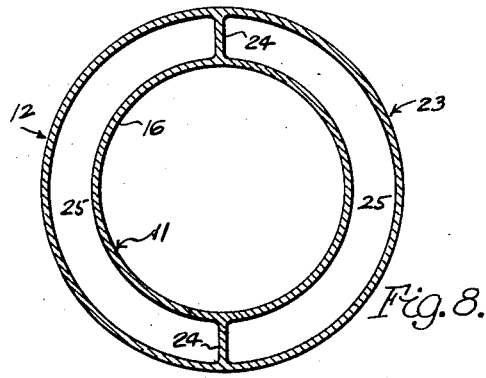
Fig. 8.
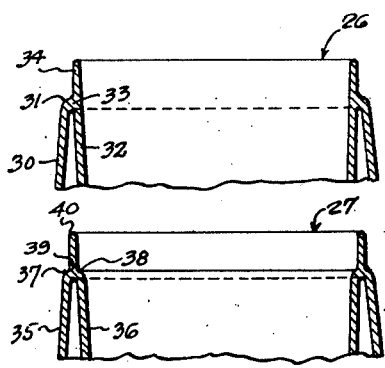
Fig. 9.
Fig. 10.
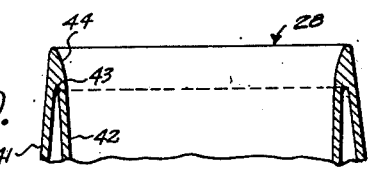
Fig. 11.
Inventor
George Howlett Davis
Barthel + Bugbee
Attorneys Patented May 5, 1953

2,637,182

UNITED STATES PATENT OFFICE 2,637,182

DOUBLE-WALLED TUMBLER

George Howlett Davis, Detroit, Mich.

Application January 27, 1950, Serial No. 140,904

2 Claims. (Cl. 65—66)

This invention relates to plastic molding and molded articles and, in particular, to molding of double-walled tumblers for beverages and the like.

Hitherto, the production of double-walled tumblers and, in particular, plastic tumblers, has been difficult where it is also desired to have a thin lip or drinking edge on the tumbler. It has been hitherto impractical to produce a commercial double-walled tumbler with a thin lip or drinking edge because the uniting of the inner and outer tumblers adjacent this lip has given rise to many difficulties, and has increased the thickness at the junction of these portions. Furthermore, the uniting of inner and outer plastic tumbler portions to produce a molded plastic tumbler, is performed in a different manner from that of glass. It has also resulted in an undesirably thick lip or drinking edge on the tumbler and has likewise given rise to a high percentage of rejections because the junction line occurs at the most conspicuous and most carefully scrutinized portion of the tumbler, namely the portion nearest the drinking edge or lip. The present invention solves these problems and avoids these difficulties by molding the outer and inner tumbler portions, less the outer bottom portion, in a single piece, after which the outer bottom portion is separately secured to the outer bottom edge. At this point, however, the junction is in the least conspicuous place, farthest from the eye of the user and least likely to attract attention.

One object of this invention is to provide a process and apparatus for molding a double-walled tumbler wherein the drinking edge or lip is made as thin as desired because the outer and inner tumbler portions are molded simultaneously in a single piece without the necessity of subsequently uniting them.

Another object is to provide a process and apparatus for molding a double-walled tumbler wherein the outer and inner tumbler portions are molded from plastic materials in a single operation, preferably by plastic injection molding methods and apparatus, and wherein the bottom of the outer tumbler portion is separately molded and subsequently added, as by cementing.

Another object is to provide a double-walled tumbler wherein the outer tumbler portion extends downward below the level of the bottom of the inner tumbler portion so as to either rest directly upon the table or to receive a separate outer bottom portion by cementing or other means of securing.

Another object is to provide a double-walled tumbler of the foregoing character wherein one or more internal ribs or webs is provided between the outer and inner tumbler portions, thereby not only structurally strengthening the tumbler but also increasing its thermal efficiency by impeding the flow of convection currents of air in the air chamber between the portions.

In the drawings:

Figure 1 is a central longitudinal section through a mold assembly for molding a double-walled tumbler, according to one form of the invention;

Figure 2 is a cross-section through the mold assembly of Figure 1, taken along the line 2—2 therein;

Figure 3 is a cross-section similar to Figure 2, but showing a modified mold assembly for producing double-walled tumblers having internal webs or ribs, as shown in Figures 7 and 8;

Figure 4 is a central longitudinal section through a mold assembly for molding the separate outer bottom of a double-walled tumbler, to be attached to the tumbler produced in the mold of Figure 1 or 3;

Figure 5 is a side elevation, partly in central vertical section, of a double-walled tumbler produced by the mold assemblies shown in Figures 1, 2 and 4;

Figure 6 is a cross-section taken along the line 6—6 in Figure 5;

Figure 7 is a side elevation, partly in vertical section, of a modified double-walled tumbler produced by the modified mold assembly shown in Figure 3;

Figure 8 is a cross-section taken along the line 8—8 in Figure 7 showing the internal web construction of the modified double-walled tumbler;

Figure 9 is a fragmentary vertical section through the upper portion of a further modified tumbler with a different type of drinking edge or lip;

Figure 10 is a fragmentary vertical section through the upper portion of a still further modified tumbler with another type of drinking edge; and Figure 11 is a fragmentary vertical section through the upper portion of a still further modified tumbler with another type of drinking edge.

*Double-walled tumbler construction*

Referring to the drawings in detail, Figures 5 and 6 show a double-walled beverage tumbler, generally designated 10, as consisting of a cup-shaped inner portion 11 and a tubular outer portion 12 having a common drinking edge or lip 13 and together constituting the upper tumbler unit, generally designated 14. The inner portion 11 is curved outwardly at its upper edge 139 to meet the outer portion 12 at a common junction 15. The inner tumbler portion 11 has a tubular side wall 16 and a bottom wall 17 integral therewith and shown as convexed downward. The outer tumbler portion 12, on the other hand, has a tubular side wall to which is separately attached an outer bottom or lower tumbler unit 18. The latter is optionally cemented to the lower edge 19 of the outer wall 12, which is extended downwardly below the lowermost point of the inner bottom 17. The outer bottom 18 is separately produced as by the molding apparatus shown in Figure 4, and may, with some loss of efficiency but at a lower cost of production, be omitted entirely, in which case the outer portion lower edge 19 will rest directly upon the table. As shown in Figure 5, however, the outer bottom 18 is optionally provided with an upwardly and inwardly inclined rim portion 20 and a downwardly convexed central portion 21 which is spaced apart from the inner bottom portion 16 and also spaced above the level of the lower edge of the outer bottom 18.

The modified double-walled tumbler, generally designated 23 (Figures 7 and 8) is generally similar to the principal form 10 of Figures 5 and 6 and similar parts are designated with similar reference numerals. The double-walled tumbler 23 of Figures 7 and 8, however, differs from the tumbler 10 of Figures 5 and 6 by having one or more webs or ribs 24 extending between the outer and inner side wall portions 12 and 16 respectively. These webs or ribs 24 serve not only to reinforce and strengthen the tumbler but also serve to impede the flow of convection currents of air throughout the interior of the chamber 25 between the outer and inner tumbler portions 11 and 12. In this manner, it increases the thermal efficiency of the tumbler.

The modified tumblers, generally designated 26, 27 and 28 shown in Figures 9, 10 and 11 respectively are similar in most respects to the tumblers 10 or 23 shown in Figures 5 and 7 except for the construction adjacent the drinking edge or lip. In the modified tumbler 26 of Figure 9, the outer tumbler portion 30 at its upper edge 31 curves inwardly to meet the inner tumbler portion 32 at a common junction 33 below the thin drinking edge or lip 34, the latter being in effect a continuation of the inner tumbler portion 32. In the modified tumbler 27 of Figure 10, the outer and inner tumbler walls 35 and 36 have upper edges 37 and 38 respectively curved toward one another to meet at a common junction 39 at the lower edge of the drinking edge or lip 40. In this modification, the drinking lip 40 is thus not co-extensive with either the outer or inner wall 35 or 36 as in the case of the tumblers 10, 23 and 26 of Figures 5, 7 and 9 respectively. In the modified tumbler 28 of Figure 11, the outer and inner walls 41 and 42 converge upwardly to meet at a junction 43 which forms the bottom edge of a tapered drinking edge or lip 44 of roughly triangular cross-section. The lip 44 is thus generally thicker than the lips 13, 34 and 39 but thinner than the combined thicknesses of the side walls 41 and 42, except at their junction.

Molding apparatus

In the molding of the tumbler 10 shown in Figures 5 and 6, the molding apparatus of Figures 1, 2 and 4 is employed. This apparatus consists of a die assembly, generally designated 50 for producing the upper tumbler unit 14 and a die assembly, generally designated 51, for producing the lower tumbler unit 18. Either of these die assemblies 50 and 51 is intended to be attached to the platens or heads 52 or 53 of a conventional plastic injection molding press, the details of which are beyond the scope of this invention.

The die assembly 50 for producing the upper tumbler unit 14 consists of a flanged base 54 bolted as at 55 to the platen or head 52 and having an annular portion 56 which is threaded as at 57 (Figure 1). Beyond the end of the threaded portion 57, the annular portion 56 is provided with a shoulder 58 leading to a cylindrical portion 59. This has a rounded junction 60 with an approximately conical portion 61 which at a rounded tapering edge 62 merges into a tapered or conical portion 63 formed within a hollow stem 64. The conical portion 63 in turn terminates in a convex end portion 65. The portions 61, 62, 63 and 65 correspond respectively to the inner wall of the tumbler portions 13, the rounded edge 13a, the inner side wall 16 and the inner bottom wall 17 (Figure 5). The base 54, annular portion 56 and stem 64 and their adjacent portions form an inner die member 66.

Threaded onto the threaded portion 57 of the base 54 is the correspondingly threaded portion 68 of an outer tubular die member 69. The latter has an annular shoulder 70 and a cylindrical portion 71 which abuts the annular shoulder 58 and cylindrical portion 59 respectively. The cylindrical portion 71 merges in a rounded junction 72 into a slightly outwardly tapered portion 73 forming the outer surface of the tumbler lip 13. The outer tubular die member 69 also has an outwardly flaring cavity 74 having a curvature corresponding to the curvature of the outer surface of the outer tumbler portion 12. The outer and inner die members 69 and 66 in assembly form a female die unit 75.

Fitting into the outwardly flaring cavity formed by the surfaces 63 and 74 (Figure 1) is a cup-shaped male die unit 76 having inner and outer surfaces 77 and 78 and a bottom surface 79 spaced away from the surfaces 63, 74 and 65 a distance equal to the thickness desired for the outer and inner walls 12 and 16 and inner bottom wall 17 of the upper tumbler unit 14. The cup-shaped die unit 76 has a base 80 which is bolted as at 81 to the platen or head 53, these being coaxially bored as at 82 and 83 respectively to form an entrance passageway leading into the die cavity, generally designated 84, between the male and female die units 76 and 75. The latter consists of the inner bottom cavity 85, the inner side wall cavity 86, the lip cavity 87, and the outer side wall cavity 88. The base 80 is provided with an annular abutment shoulder 89 abuttingly engaging the annular end wall 90 of the outer tubular member 69 when the die units 75 and 76 are in their closed positions shown in Figure 1. Vents 91 are provided at the end of the die cavity 78 and extend to the atmosphere through the base 80 (Figure 1) in order to vent the air from the die cavity 84 when the charge of plastic material is injected through the passageways 83 and 82.

The die assembly 51 for producing the lower tumbler unit or outer bottom 18 (Figure 4) consists of flanged die halves 95 and 96 which are bolted as at 97 and 98 respectively to the platens or heads 52 and 53 of another conventional plastic injection molding press. The die half 95, which is the female die unit, has an outer annular flange 99 abuttingly engaging a corresponding annular recess 100 in the die half or male die unit 96 when the dies are in their closed positions shown in Figure 4. The flange 99 has vents 101 leading from the inner side thereof to the atmosphere for venting the die cavity, generally designated 102.

The die cavity 102 is formed on one side by an annular surface 103, an inwardly tapered surface 104 and an outwardly convex surface 105 on the female die half 95. The opposite side of the die cavity 102 is formed by an annular surface 106, an inwardly tapering surface 107 and a concave surface 108, all of these being spaced approximately the same distances from their counterpart surfaces 103, 104 and 105, according to the thickness desired for the lower tumbler unit or outer bottom 18. Together they produce the die cavity 102 which thus consists of an outer portion, an intermediate portion and an inner portion corresponding to the portions 22, 20 and 21 respectively of the lower tumbler unit or outer bottom 18. Aligned passages 109 and 110 lead into the central or inner portion 108 of the die cavity 102 for the injection of molding material therein.

The modified die assembly 111 is similar in nearly all respects to the die assembly 50 and similar parts bear the same reference numerals. The female die unit 75 is the same as in Figure 1, having the same outer and inner members 69 and 66. The male die unit 76 in Figure 3, however, is provided with one or more approximately radial slots 112 extending from top to bottom or as far as is desired, in order to interconnect the die cavities 86 and 88. These slots 112 form the webs or ribs 24 (Figures 7 and 8) in the modified tumbler 23 for strengthening the tumbler and impeding convection currents.

*Process of manufacture*

In carrying out the process of the invention, let it be assumed that the apparatus is set up as shown in Figures 1 and 4, which requires either two separate plastic injection molding presses or the use of a single press at different times for producing the upper and lower tumbler units 14 and 18 respectively. To produce the upper tumbler unit 14, the die units 75 and 76 are moved into their closed positions (Figure 1) by moving the platens 52 and 53 toward one another until the annular surfaces 89 and 90 engage one another. The injection apparatus, which includes the usual heated plastic injector and nozzle (not shown) then forces hot fluid plastic material through the passageways 82 and 83 into the die cavity 84, passing through the portions 85, 86, 87 and 88 thereof until it reaches the vents 91. Meanwhile, the air in the die cavity 84 has been forced out through the vents 91 as the fluid plastic material advances. The material is allowed to solidify in the die cavity 84, after which the platens or heads 52 and 53 are separated to open the die units 75 and 76 and permit the upper tumbler unit 14 to be removed. The flash or excess plastic material is then trimmed off the workpiece and it is ready for use either with or without the outer bottom or lower tumbler unit 18. As previously stated, since the lower edge 19 of the outer tumbler wall 12 is located below the level of the inner bottom 17, it can, if desired, rest directly on the table and thereby form the desired dead air space. It is preferable, however, to employ the outer bottom member 18, not only because the interior of the glass air chamber 25 is kept clean but also because the chamber 25 is air-tight and no air can enter or leave, as it would do if the upper tumbler unit 14 alone were used upon an uneven surface of a table.

The lower tumbler unit 18 or outer bottom is produced in an analogous manner to the upper tumbler unit 14. The die halves 95 and 96 are moved into engagement with one another by moving the platens 52 and 53 toward one another into the closed position shown in Figure 4. Hot fluid plastic material is then injected into the die cavity 102 and fills the portions 108, 107 and 106, driving the air out through the vents 101. When the material has hardened or set sufficiently, the platens 52 and 53 are moved away from one another, separating the mold halves 95 and 96 and permitting the workpiece to be removed. The flash or excess molding material is then trimmed off, after which the edge portion 22 of the lower tumbler unit 18 or outer bottom is cemented or otherwise secured to the lower edge 19 of the outer wall 12 of the upper tumbler unit 14. The tumbler is then ready for use.

The making of the internally webbed or ribbed tumbler 23 is substantially the same as that just described, except that the apparatus of Figure 3 is employed. As the hot plastic fluid material flows through the various portions of the die cavity 84, it likewise flows from the die cavity portion 86 to the die cavity portion 88 by way of the slots 112, filling these as a part of the die cavity 84. When the workpiece has set or hardened sufficiently, the die halves are separated as before, the workpiece removed and the flash trimmed off, as described below. A bottom unit 18 may then be cemented in place, likewise in the manner described above.

What I claim is:

1. A double-walled tumbler comprising a one-piece body member having a cup-shaped inner container and a tubular outer wall extending downwardly from the upper edge portion of said inner container in spaced relationship therewith, said outer wall having a lower edge portion extending below the lowermost portion of said inner container to space the bottom of said inner container above the surface of a table upon which said tumbler is placed, the bottom of said inner container being concavely curved, and a separate inwardly dished outer bottom member permanently secured to the lower edge portion of said tubular outer wall and closing the opening defined thereby, the said outer bottom member being convexly curved to be substantially parallel to the concavely curved bottom of said inner container so that only a limited contact is provided for the tumbler with the table surface by contact of peripheral portions of said outer bottom member.

2. A double-walled tumbler comprising a one-piece body member having a cup-shaped inner container with a vertical inner sidewall, a tubular outer wall extending downwardly from the upper edge portion of said inner wall in spaced relationship therewith, a radially disposed web interconnecting said inner and outer walls and extending longitudinally throughout the vertical extent of said walls to divide the space therebetween, said outer wall having a lower edge portion extending below the lowermost portion of said inner wall to space the bottom of said inner wall from the surface of a table upon which said tumbler is placed, the bottom of said inner wall being downwardly curved, and a separate inwardly dished outer bottom member permanently secured to the lower edge portion of said tubular outer wall and closing the opening defined thereby, a portion of said outer bottom member being reversely curved to be substantially parallel to the bottom of said inner member to provide contact of the tumbler with the table surface limited to its edge portions.

GEORGE HOWLETT DAVIS.

References Cited in the file of this patent

UNITED STATES PATENTS

| Number | Name | Date |
|---|---|---|
| 723,796 | Williams | Mar. 24, 1903 |
| 1,208,483 | Chesbrough | Dec. 12, 1916 |
| 1,519,034 | Livingston | Dec. 9, 1924 |
| 1,968,263 | Reuther | July 31, 1934 |
| 1,975,241 | Werber et al. | Oct. 2, 1934 |
| 1,997,055 | Graefe | Apr. 9, 1935 |
| 2,399,117 | Hart | Apr. 23, 1946 |
| 2,436,122 | Rotsler | Feb. 17, 1948 |
| 2,493,633 | Mart | Jan. 3, 1950 |
| 2,499,565 | Booth | Mar. 7, 1950 |

FOREIGN PATENTS

| Number | Country | Date |
|---|---|---|
| 92,683 | Austria | May 25, 1923 |
| 349,895 | Italy | June 30, 1937 |

OTHER REFERENCES

Macht—"Molding Methyl Methacrylate Resins"—Modern Plastics, Sept. 1945—Pages 112-117 18—I. M. Digest.